(12) United States Patent
Nakada et al.

(10) Patent No.: US 11,354,799 B2
(45) Date of Patent: Jun. 7, 2022

(54) IMAGE PROCESSING FOR INSPECTING AN INSPECTION TARGET IMAGE SO THAT A DIFFERENCE IN THE DIFFERENCE IMAGE GREATER THAN A THRESHOLD VALUE IS REDUCED

(71) Applicant: CANON KABUSHIKI KAISHA, Tokyo (JP)

(72) Inventors: Yuichi Nakada, Kanagawa (JP); Kosei Takahashi, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/208,401

(22) Filed: Mar. 22, 2021

(65) Prior Publication Data
US 2021/0304384 A1    Sep. 30, 2021

(30) Foreign Application Priority Data
Mar. 27, 2020 (JP) .............................. JP2020-058463

(51) Int. Cl.
*G06T 7/00* (2017.01)
*H04N 1/00* (2006.01)

(52) U.S. Cl.
CPC ......... *G06T 7/001* (2013.01); *H04N 1/00005* (2013.01); *H04N 1/00045* (2013.01); *H04N 1/00087* (2013.01)

(58) Field of Classification Search
CPC ................ G06T 7/001; H04N 1/00087; H04N 1/00005; H04N 1/00045
See application file for complete search history.

(56) References Cited

U.S. PATENT DOCUMENTS

| | | | |
|---|---|---|---|
| 2020/0009860 A1* | 1/2020 | Kamada | .................... G06T 7/11 |
| 2020/0111199 A1* | 4/2020 | Ikeda | ...................... G06T 7/001 |

FOREIGN PATENT DOCUMENTS

JP    2018-004276 A    1/2018

* cited by examiner

*Primary Examiner* — Christopher Wait
(74) *Attorney, Agent, or Firm* — Canon U.S.A., Inc. IP Division

(57) ABSTRACT

An image processing apparatus includes an acquisition unit configured to acquire reference data and image data representing an inspection target image, the reference data representing a reference image that is a reference printing result, a setting unit configured to set a detection sensitivity for a plurality of defects in a printing result, a correction unit configured to correct a difference image acquired from the reference data and the image data so that a difference in the difference image that is greater than a threshold value is reduced, and a processing unit configured to inspect the inspection target image based on the detection sensitivity and the corrected difference image.

14 Claims, 15 Drawing Sheets

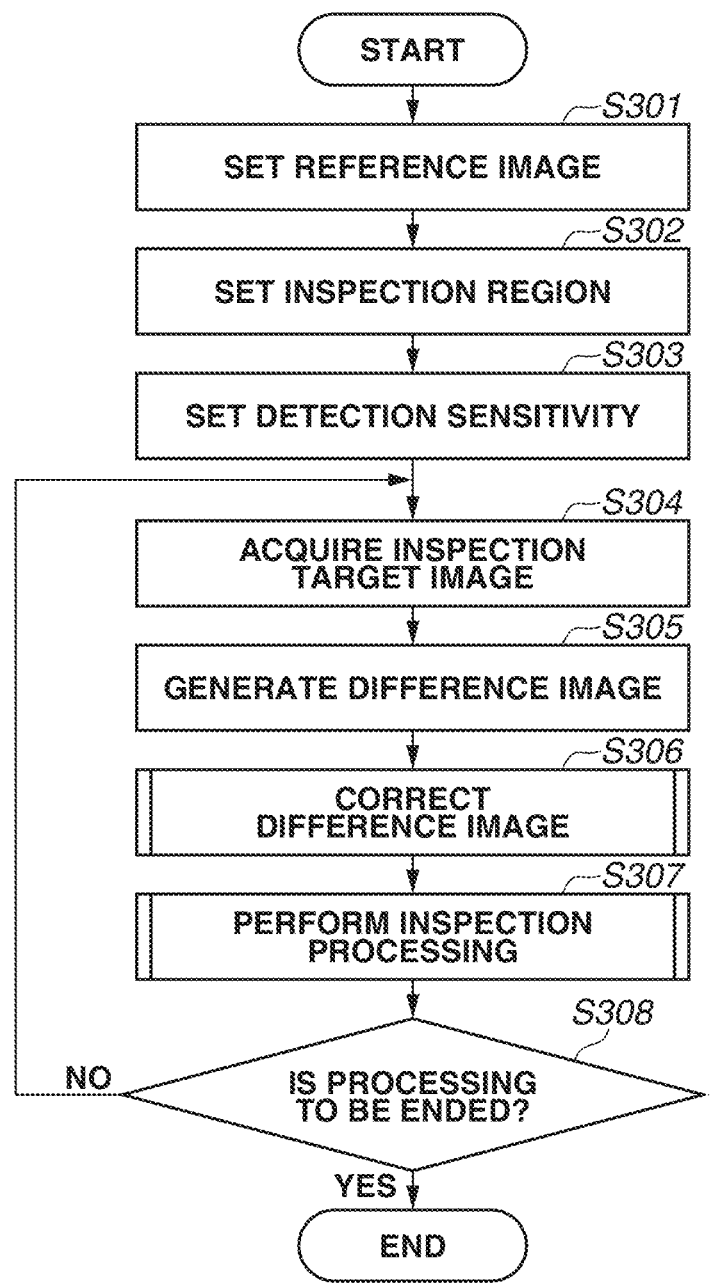

FIG.6A

|  | DETECTION SENSITIVITY | | |
|---|---|---|---|
|  | POINT DEFECT | VERTICAL-LINE DEFECT | HORIZONTAL-LINE DEFECT |
| REGION A | LOW | HIGH | HIGH |

FIG.6B

|  | DETECTION SENSITIVITY | | |
|---|---|---|---|
|  | POINT DEFECT | VERTICAL-LINE DEFECT | HORIZONTAL-LINE DEFECT |
| REGION A | LOW | LOW | LOW |
| REGION B | LOW | HIGH | HIGH |

FIG.6C

|  | DETECTION SENSITIVITY | | |
|---|---|---|---|
|  | POINT DEFECT | VERTICAL-LINE DEFECT | HORIZONTAL-LINE DEFECT |
| REGION A | INTERMEDIATE | HIGH | HIGH |
| REGION B | LOW | HIGH | HIGH |

IMAGE PROCESSING FOR INSPECTING AN INSPECTION TARGET IMAGE SO THAT A DIFFERENCE IN THE DIFFERENCE IMAGE GREATER THAN A THRESHOLD VALUE IS REDUCED

BACKGROUND

Field of the Disclosure

The present disclosure relates to an image processing technique for inspecting printed materials.

Description of the Related Art

There are cases where a color material such as ink or toner adheres to an unintended portion of a printed material output from a printing apparatus and forms a mark on the printed material. Further, there are cases where a color material is insufficiently applied to a portion where an image is to be formed, and the resulting color is paler than it is supposed to be and causes a color loss. A defect such as a mark or a color loss in a printed material decreases the quality of the printed material. This gives rise to a demand for inspecting a printed material for defects to guarantee the quality of the printed material. Since the cost of visually inspecting a printed material for defects is high, automatic inspection systems have been developed. In an automatic inspection system, for example, whether there is a defect is determined based on a difference between a reference image and an inspection target image acquired by scanning an inspection target printed material. The reference image is registered in advance and used as a reference in inspecting printed materials. Japanese Patent Application Laid-Open No. 2018-4276 discusses a technique of detecting a region with a great difference between the reference image and the inspection target image as a candidate defect portion, and inspecting whether the candidate defect portion is a defect based on a feature amount in accordance with a defect type of the candidate defect portion.

In the technique discussed in Japanese Patent Application Laid-Open No. 2018-4276, however, the defect type is determined after the region with a great difference between the reference image and the inspection target image is detected as a candidate defect portion, so that the inspection accuracy sometimes decreases in a case where a contrast between a defect and a background of the defect varies depending on the defect type.

SUMMARY

Embodiments of the present disclosure are directed to a process for inspecting a printed material with high accuracy even in a case where a contrast between a defect and a background of the defect varies depending on the defect type.

According to embodiments of the present disclosure, an image processing apparatus includes an acquisition unit configured to acquire reference data and image data representing an inspection target image, the reference data representing a reference image that is a reference printing result, a setting unit configured to set a detection sensitivity for a plurality of defects in a printing result, a correction unit configured to correct a difference image acquired from the reference data and the image data so that a difference in the difference image that is greater than a threshold value is reduced, and a processing unit configured to inspect the inspection target image based on the detection sensitivity and the corrected difference image.

Further features of the present disclosure will become apparent from the following description of exemplary embodiments with reference to the attached drawings.

BRIEF DESCRIPTION OF THE DRAWINGS

FIG. 3 is a flowchart illustrating a process that is executed by the image processing apparatus.

FIGS. 6A to 6C is illustrate examples of detection sensitivities.

DESCRIPTION OF THE EMBODIMENTS

Various exemplary embodiments of the present disclosure will be described below with reference to the drawings. The following exemplary embodiments are not intended to limit the scope of the present disclosure. Further, not every combination of features described in the exemplary embodiments is necessarily essential to a technical solution of the present disclosure.

In a first exemplary embodiment, defects of a defect type for which a low detection sensitivity is set are detected based on a difference image between a reference image and an inspection target image, whereas defects of a defect type for which a high detection sensitivity is set are detected based on a corrected difference image acquired by clipping pixel values of the difference image using a threshold value. An inspection according to the present exemplary embodiment is performed based on the absolute values of differences between an image (reference image) representing a desired printing result and an image (inspection target image) that is an inspection target.

<Configuration of Printing System>

Figure 1:
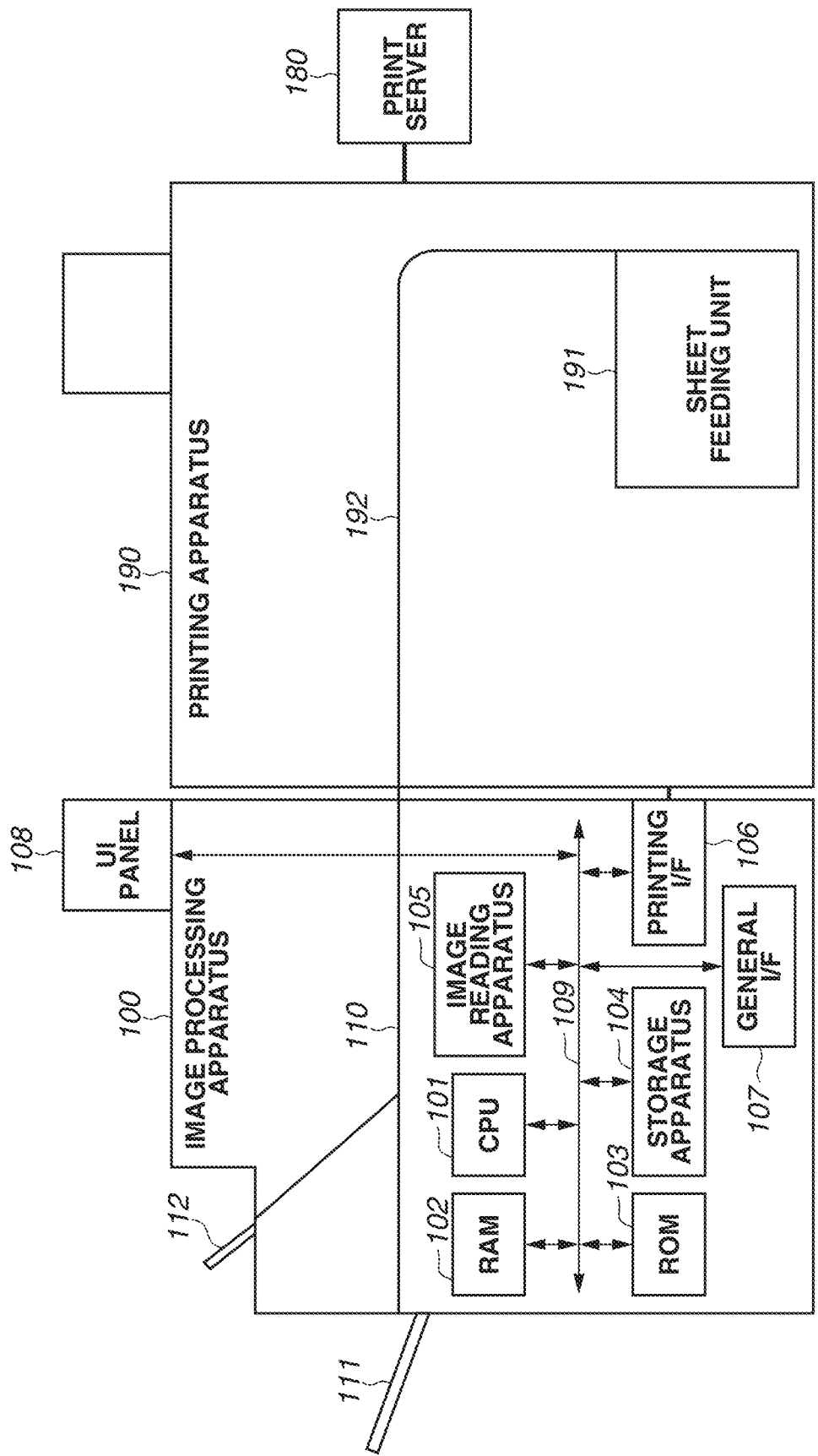
FIG. 1 is a diagram illustrating a configuration of a printing system including an image processing apparatus.

FIG. 1 is a diagram illustrating an example of a configuration of an entire printing system including an image processing apparatus 100. The printing system outputs a printed material and inspects the printed material. The printing system according to the present exemplary embodiment includes the image processing apparatus 100, a print server 180, and a printing apparatus 190. The print server 180 generates a print job for a document to be printed and inputs the print job to the printing apparatus 190. The printing apparatus 190 forms an image on a recording medium (print sheet) based on the print job input from the print server 180. The printing apparatus 190 includes a sheet feeding unit 191, and print sheets are set in advance in the sheet feeding unit 191 by a user. When a print job is input, the printing apparatus 190 conveys the print sheet set in the sheet feeding unit 191 along a conveyance path 192, forms an image on a surface (one side or both sides) of the conveyed sheet, and conveys the printed sheet to the image processing apparatus 100. While the printing apparatus 190 according to the present exemplary embodiment is an electrophotographic printing apparatus, an offset printing apparatus or an inkjet printing apparatus can be employed.

The image processing apparatus 100 inspects a printed inspection target printed material for defects. The inspection target printed material generated by forming an image on the print sheet by the printing apparatus 190 is conveyed along the conveyance path 192 and inspected by the image processing apparatus 100. The image processing apparatus 100 functions as an inspection processing apparatus. The image processing apparatus 100 includes a central processing unit (CPU) 101, a random access memory (RAM) 102, and a read-only memory (ROM) 103. The image processing apparatus 100 further includes a storage apparatus 104, an image reading apparatus 105, a printing interface (printing I/F) 106, a general interface (general I/F) 107, a user interface (UI) panel 108, and a main bus 109. The image processing apparatus 100 further includes a conveyance path 110 and output trays 111 and 112. The conveyance path 110 for printed materials is connected to the conveyance path 192 of the printing apparatus 190. Printed deliverables that have passed the inspection are output to the output tray 111, whereas printed materials that have failed the inspection due to a detected defect are output to the output tray 112. Instead of dividing the printed materials into the two categories, i.e., pass and fail, the printed materials can be divided into more categories. In the printing system, the storage apparatus 104, the image reading apparatus 105, the UI panel 108, the conveyance path 110, the output tray 111, and the output tray 112 can be provided outside the image processing apparatus 100.

The CPU 101 is a processor that comprehensively controls the components of the image processing apparatus 100. The RAM 102 functions as a main memory and a working area of the CPU 101. The ROM 103 stores programs to be executed by the CPU 101. The storage apparatus 104 stores an application to be executed by the CPU 101 and data for use in image processing. The image reading apparatus 105 is a scanner and reads one side or both sides of a printed material transmitted from the printing apparatus 190 on the conveyance path 110 and acquires image data.

The printing I/F 106 is connected to the printing apparatus 190 and is an interface for synchronizing timings of processing printed materials between the image processing apparatus 100 and the printing apparatus 190 and for notifying the image processing apparatus 100 and the printing apparatus 190 of operation statuses of each other. The general I/F 107 is a serial bus interface, such as a Universal Serial Bus (USB) interface or an Institute of Electrical and Electronics Engineers (IEEE) 1394 interface, and enables a user to carry data such as logs. The UI panel 108 is a display apparatus, such as a liquid crystal display, and functions as a user interface that notifies a user of a current status and settings of the image processing apparatus 100. The UI panel 108 can include an input apparatus, such as a touch panel or buttons, and receives inspection-related instructions from the user. The input apparatus can be a separate apparatus from the UI panel 108, such as a mouse or keyboard. The main bus 109 is a transmission path that connects the modules of the image processing apparatus 100.

While conveying a printed material conveyed from the printing apparatus 190 along the conveyance path 110, the image processing apparatus 100 inspects the printed material as described below based on image data of the printed material that is read by the image reading apparatus 105. If the printed material passes the inspection, the printed material is conveyed to the output tray 111 for "pass". If the printed material fails the inspection, the printed material is conveyed to the output tray 112 for "fail". Consequently, only the printed materials that are confirmed to satisfy a quality level are gathered together as deliverable printed materials on the output tray 111.

<Functional Configuration of Image Processing Apparatus>

Figure 2:
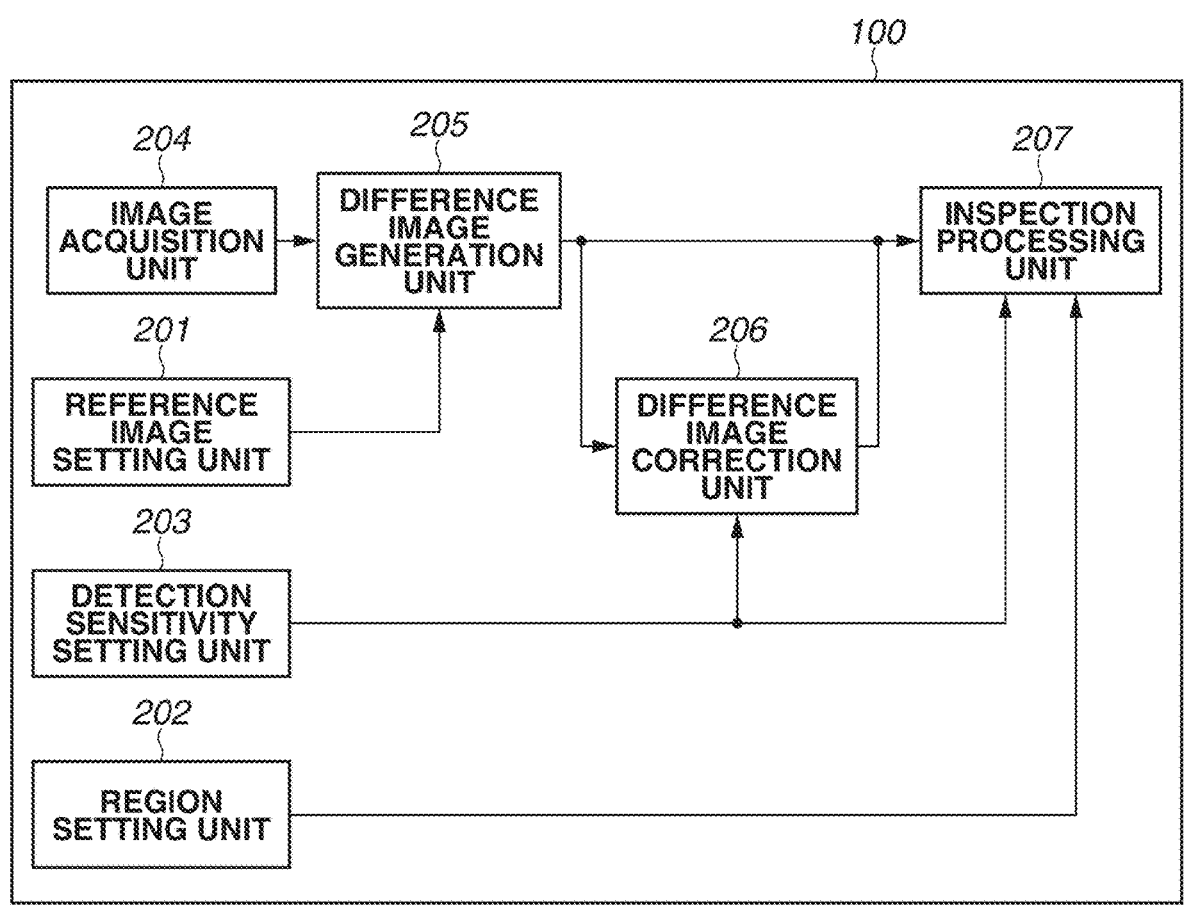
FIG. 2 is a block diagram illustrating a functional configuration of the image processing apparatus.

A functional configuration of the image processing apparatus 100 will be described below with reference to FIG. 2. The image processing apparatus 100 includes a reference image setting unit 201, a region setting unit 202, a detection sensitivity setting unit 203, an image acquisition unit 204, a difference image generation unit 205, a difference image correction unit 206, and an inspection processing unit 207.

The reference image setting unit 201 sets an image represented by image data recorded in the RAM 102 or the storage apparatus 104 as a reference image. The region setting unit 202 sets an inspection region for the reference image based on a user instruction acquired via the UI panel 108. The detection sensitivity setting unit 203 sets a detection sensitivity for a defect in each inspection region based on a user instruction acquired via the UI panel 108. There are three types of defects in the present exemplary embodiment, i.e., a defect in the shape of a point (hereinafter, referred to as "point defect"), a defect in the shape of a vertical line (hereinafter, referred to as "vertical-line defect"), and a defect in the shape of a horizontal line (hereinafter, referred to as "horizontal-line defect"). The image acquisition unit 204 acquires inspection target image data that represents an inspection target image and is acquired by reading a printed material on the conveyance path 110 by the image reading apparatus 105. The acquired inspection target image data is stored in the RAM 102 or the storage apparatus 104. The difference image generation unit 205 generates a difference image based on the reference image and the inspection target image. The difference image correction unit 206 generates a corrected difference image by clipping pixel values of the difference image using a threshold value corresponding to the detection sensitivity. The inspection processing unit 207 inspects the inspection target image based on the difference image, the corrected difference image, and the detection sensitivity and outputs an inspection result.

<Process Performed by Image Processing Apparatus>

Figure 4A:
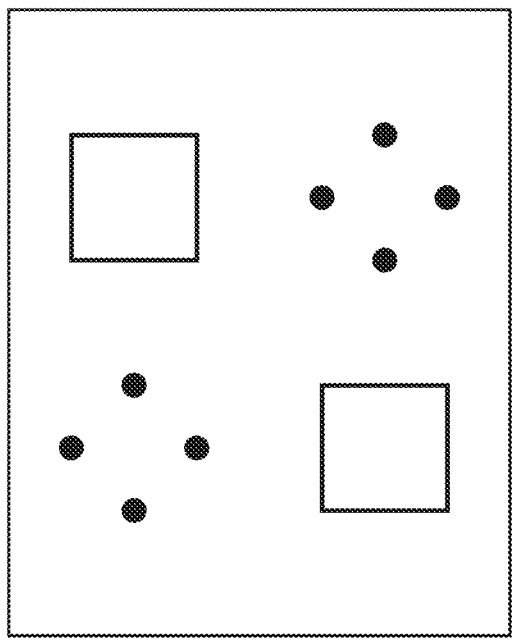
FIGS. 4A to 4D illustrate examples of a reference image and an inspection target image.
Figure 5A:
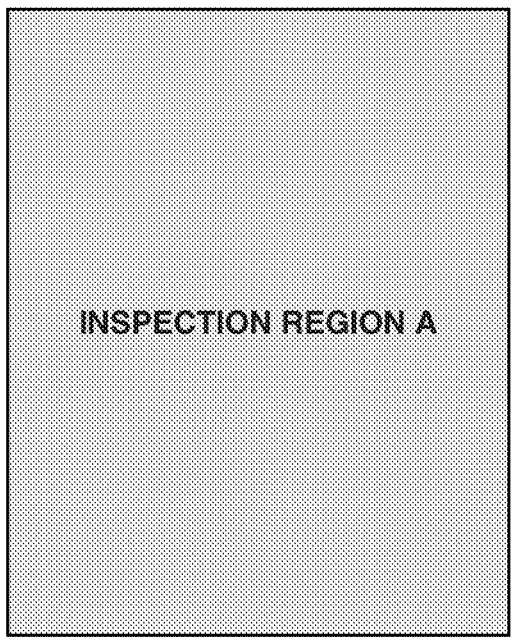
FIGS. 5A and 5B illustrate examples of inspection regions.

FIG. 3 is a flowchart illustrating a process that is performed by the image processing apparatus 100. In step S301, the reference image setting unit 201 sets a reference image. An example of the reference image is illustrated in FIG. 4A. Reference image data representing the reference image is generated in advance based on a scanned image acquired by scanning a printed material output from the printing apparatus 190 and is recorded in the RAM 102 or the storage apparatus 104. In step S302, the region setting unit 202 sets an inspection region for the reference image based on a user instruction acquired via the UI panel 108. An example of the inspection region is illustrated in FIG. 5A. In the present exemplary embodiment, the region setting unit 202 sets the entire reference image as an inspection region A. In step S303, the detection sensitivity setting unit 203 sets a detection sensitivity for a defect in each inspection region based on a user instruction acquired via the UI panel 108. In the present exemplary embodiment, the detection sensitivity setting unit 203 sets detection sensitivities for the point defect and the line-shaped defect in each inspection region in three levels that are "high", "intermediate", and "low". At higher detection sensitivities, defects with lower contrasts to their backgrounds and defects with smaller sizes are detected. An example of the detection sensitivity is illustrated in FIG. 6A. For the inspection region A, the detection sensitivity for the point defect is set to "low", whereas the detection sensitivities for the vertical-line defect and the horizontal-line defect are each set to "high".

Figure 4B:
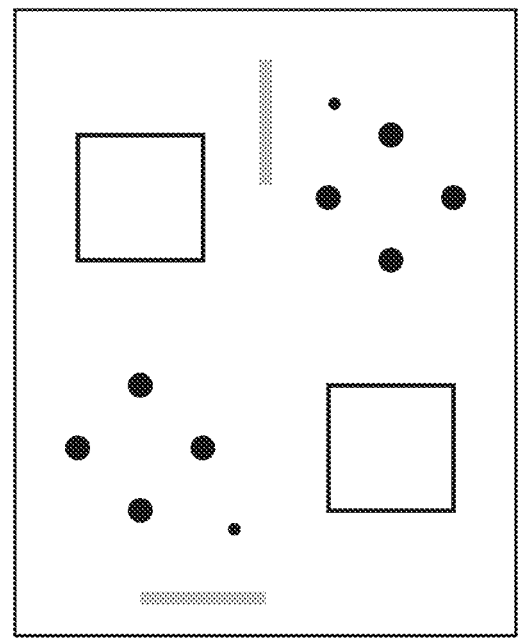
Figure 4C:
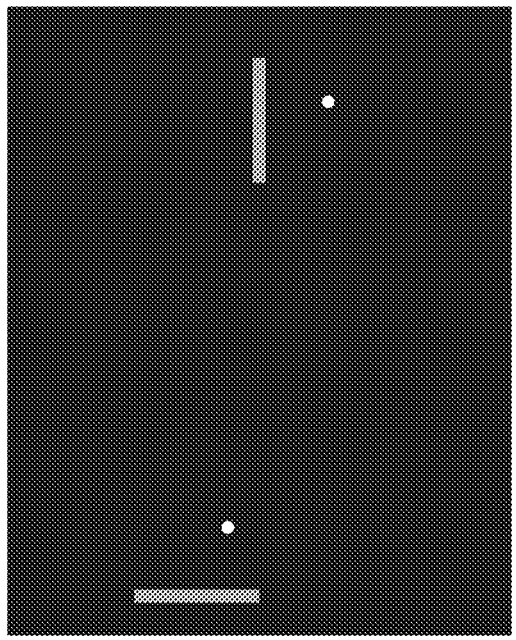

In step S304, the image acquisition unit 204 acquires the inspection target image data representing the inspection target image. An example of the inspection target image is illustrated in FIG. 4B. As illustrated in FIG. 4B, the inspection target image contains marks. In step S305, the difference image generation unit 205 calculates the absolute value of each luminance value difference between corresponding pixels of the reference image and the inspection target image based on the reference image and the inspection target image and generates a difference image in which each pixel has the absolute value of the luminance value difference. An example of the difference image is illustrated in FIG. 4C.

Figure 7:
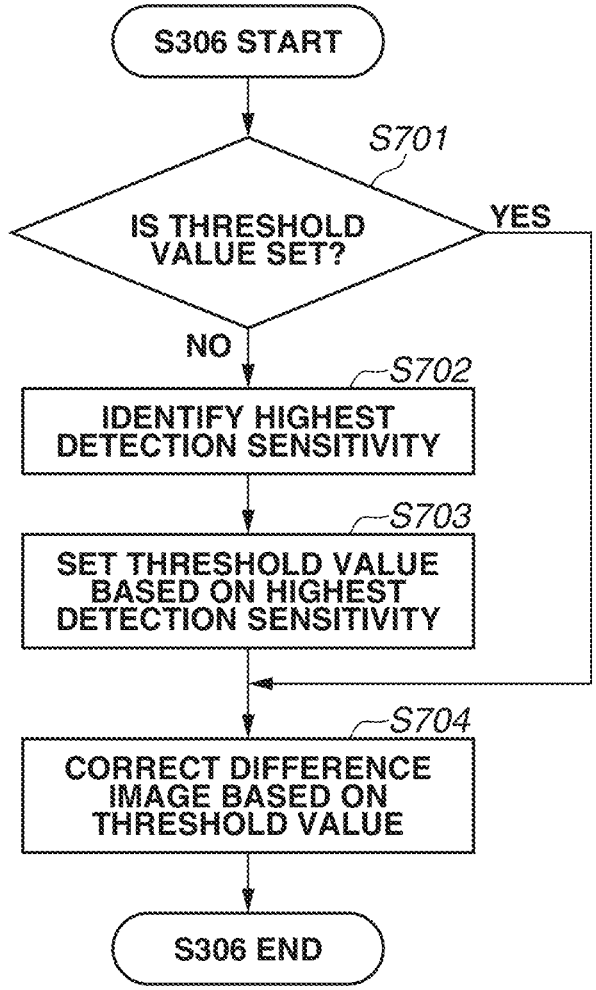
FIG. 7 is a flowchart illustrating a process for correcting a difference image.

In step S306, the difference image correction unit 206 generates a corrected difference image by clipping the pixel values of the difference image using a threshold value set based on the detection sensitivity. FIG. 7 is a flowchart illustrating a process for correcting the difference image. Details of the process for correcting the difference image will be described below. In step S701, the difference image correction unit 206 determines whether the threshold value is set for the processing target inspection region. In a case where the threshold value is set (YES in step S701), the processing proceeds to step S704. On the other hand, in a case where the threshold value is not set (NO in step S701), the processing proceeds to step S702. In step S702, the difference image correction unit 206 identifies the highest detection sensitivity for the processing target inspection region. In the present exemplary embodiment, the difference image correction unit 206 identifies the highest one of the detection sensitivities for the point defect, the vertical-line defect, and the horizontal-line defect as the highest detection sensitivity. The highest detection sensitivity for the inspection region A is "high".

In step S703, the difference image correction unit 206 sets the threshold value for the processing target inspection region based on the highest detection sensitivity. In the present exemplary embodiment, the difference image correction unit 206 sets a threshold value $Th_A$ for the inspection region A so that the higher the highest detection sensitivity, the smaller the set threshold value $Th_A$.

Figure 4D:
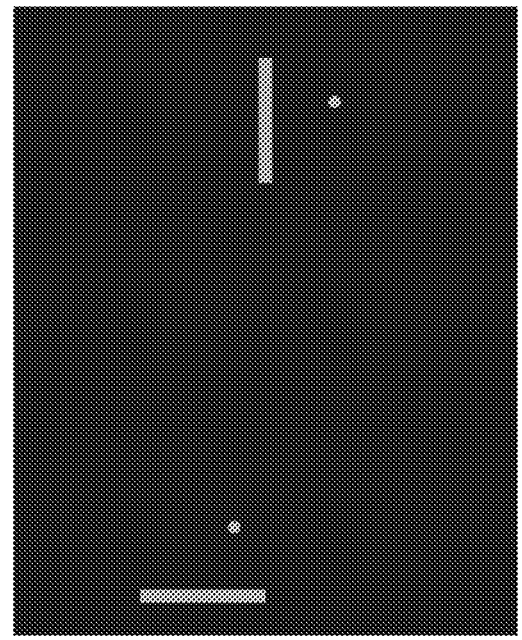

In step S704, the difference image correction unit 206 generates a corrected difference image by clipping the pixel values of the difference image based on the threshold value $Th_A$. Specifically, the difference image correction unit 206 replaces the pixel value of each pixel having a greater pixel value than the threshold value $Th_A$ in the inspection region A of the difference image with the threshold value $Th_A$. An example of the corrected difference image generated by the processing of step S704 is illustrated in FIG. 4D. By the processing of step S704, each pixel value corresponding to a defect such as a mark with a high contrast to a background in the difference image is replaced with the threshold value $Th_A$. Furthermore, the pixel having a greater pixel value than the threshold value $Th_A$ can be replaced to a pixel value smaller than the $Th_A$.

In step S307, the inspection processing unit 207 inspects the inspection target image based on the difference image, the corrected difference image, and the detection sensitivity and outputs an inspection result. Details of the inspection process will be described below. In step S308, the inspection processing unit 207 determines whether the process is to be ended based on print information from the printing apparatus 190 and a user instruction acquired via the UI panel 108. In a case where the inspection processing unit 207 determines that the process is not to be ended (NO in step S308), the processing proceeds to step S304.

<Inspection Process>

Figure 8:
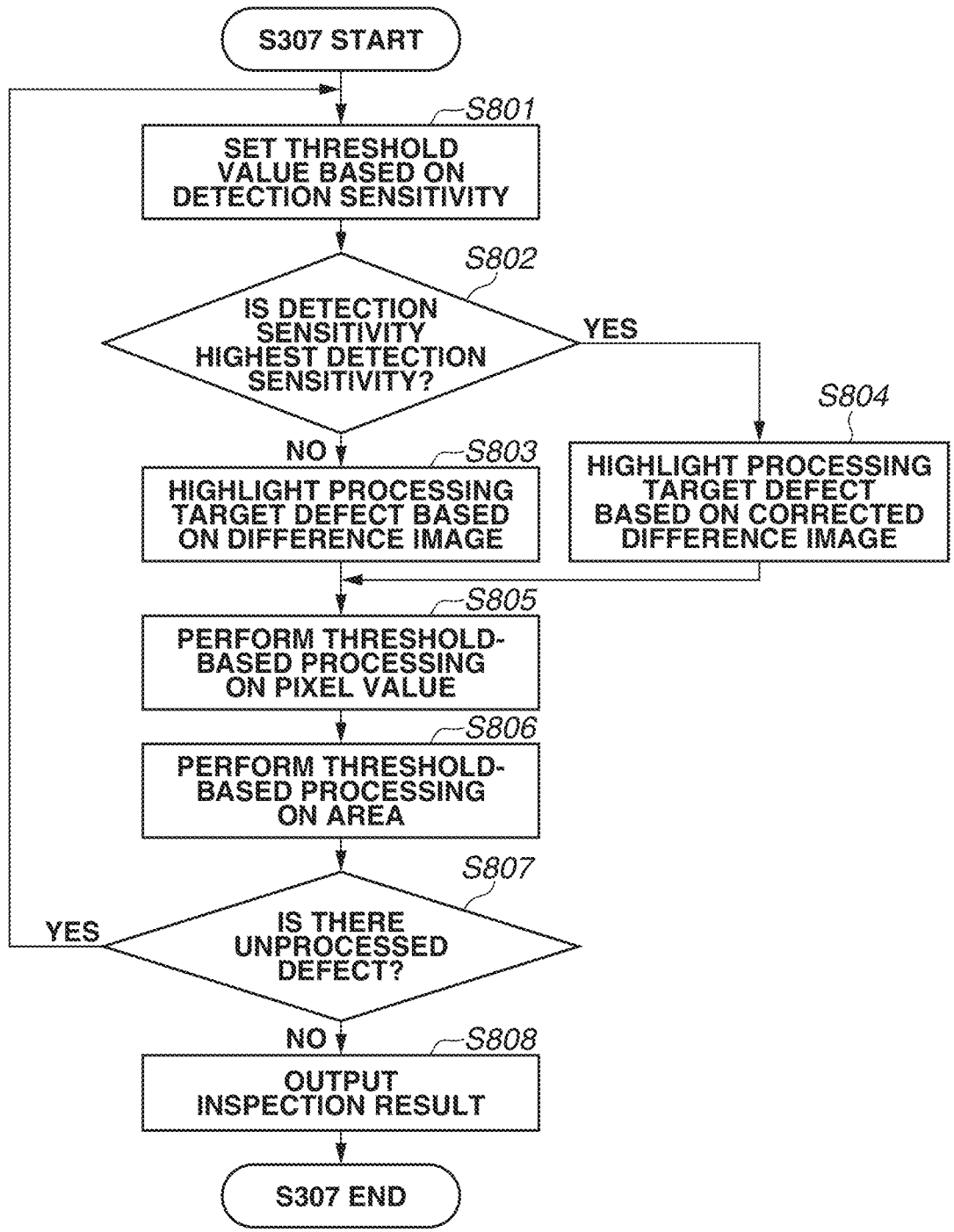
FIG. 8 is a flowchart illustrating an inspection process.
Figure 9:
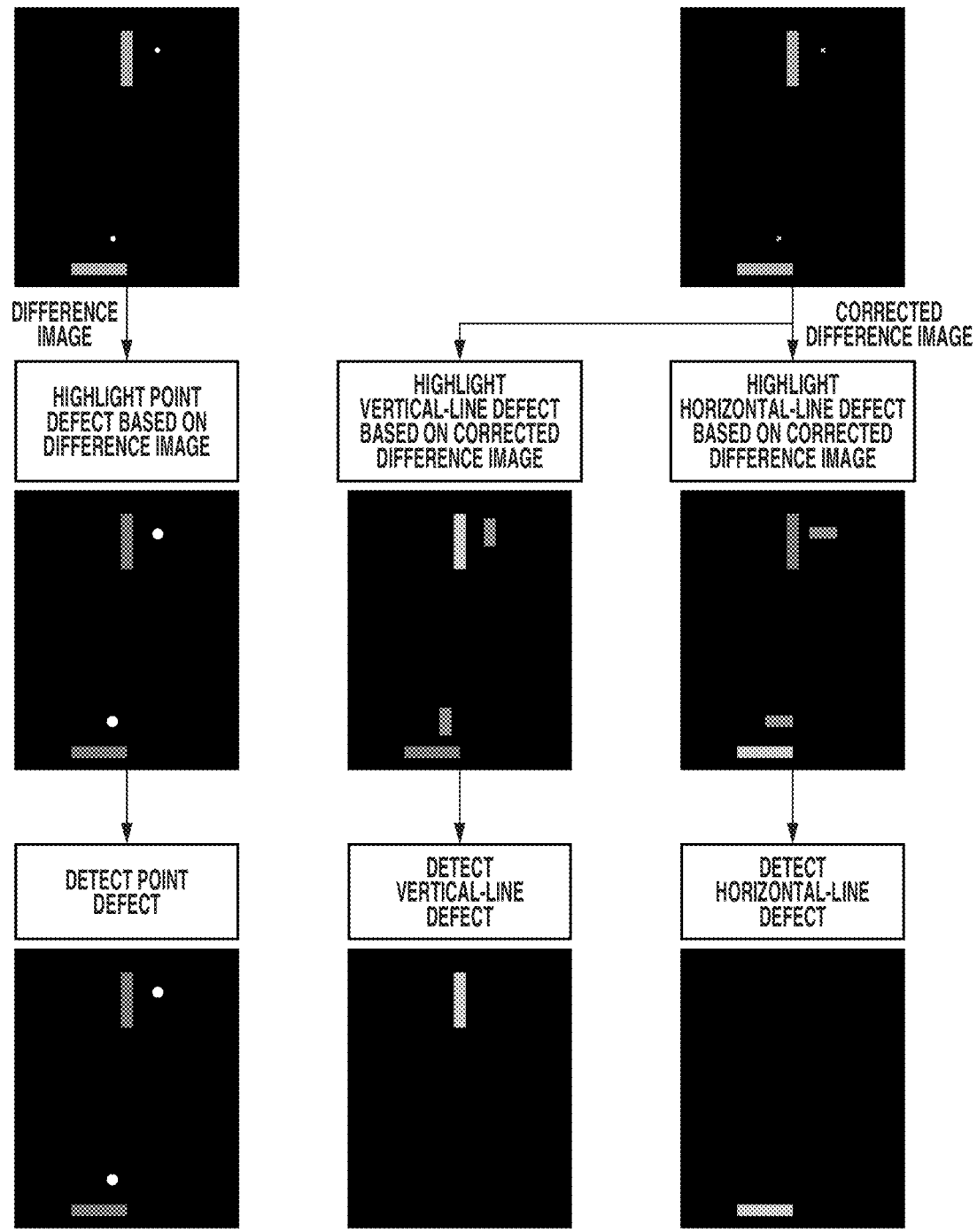
FIG. 9 is a diagram illustrating an outline of the inspection process.

FIG. 8 is a flowchart illustrating an inspection process. FIG. 9 is a diagram illustrating an outline of the inspection process. In the inspection process according to the present exemplary embodiment, in a case where the detection sensitivity for a processing target defect is high, a process for highlighting the defect is performed on the corrected difference image, and the defect detection is performed. This reduces erroneous detection of a defect. For example, in a case where the detection sensitivities for the vertical-line defect and horizontal-line defect are the highest detection sensitivity, a dot-shaped mark that is not supposed to be detected at the detection sensitivity for the point defect may erroneously be detected as a vertical-line defect or a horizontal-line defect. Thus, the difference image and the clipped corrected difference image are switched based on the detection sensitivity to prevent a contrast between a defect and a background of the defect from varying significantly between the defect types, and the inspection process is performed based on the detection sensitivity set for each defect type. Details of the inspection process will be described below. In step S801, the inspection processing unit 207 sets a threshold value for use in inspection based on the detection sensitivity for the processing target inspection region and the processing target defect. In the present exemplary embodiment, pixel values of a defect-highlighted image described below are compared with a threshold value $Th_1$ to detect a defect pixel of a defect region. Furthermore, in order to determine whether the defect region has a sufficient area, the area of the defect region consisting of continuous defect pixels is compared with a threshold value $Th_2$. Thus, in step S801, the inspection processing unit 207 sets the threshold values $Th_1$ and $Th_2$. Specifically, the inspection processing unit 207 sets the threshold values $Th_1$ and $Th_2$ so that defects with lower contrasts to their backgrounds and defects with smaller sizes are detected at higher detection sensitivities. The inspection processing unit 207 sets the threshold value $Th_1$ to smaller values with respect to higher detection sensitivities and sets the threshold value $Th_2$ to smaller values with respect to higher detection sensitivities.

In step S802, the inspection processing unit 207 determines whether the detection sensitivity for the processing target defect is the highest detection sensitivity for the processing target region. In a case where the detection sensitivity for the processing target defect is the highest detection sensitivity (YES in step S802), the processing proceeds to step S804. On the other hand, in a case where the detection sensitivity for the processing target defect is not the highest detection sensitivity (NO in step S802), the processing proceeds to step S803.

In step S803, the inspection processing unit 207 generates a defect-highlighted image by highlighting each processing target defect in the difference image. In a case where the processing target defect is the point defect, a point highlighting filter is applied to the difference image. A publicly-known two-dimensional Laplacian of Gaussian (LoG) filter is used as the point highlighting filter. Alternatively, a publicly-known two-dimensional filter such as a Difference of Gaussian (DoG) filter can be used as the point highlighting filter. In a case where the processing target defect is the vertical-line defect, a vertical-line highlighting filter using a combination of a one-dimensional filter for horizontal differentiation and a one-dimensional filter for vertical smoothing is applied to the difference image. In a case where the processing target defect is the horizontal-line defect, a horizontal-line highlighting filter using a combination of a one-dimensional filter for vertical differentiation and a one-dimensional filter for horizontal smoothing is applied to the difference image. In the present exemplary embodiment, in a case where the processing target defect is the point defect, a defect-highlighted image is generated based on the difference image.

In step S804, the inspection processing unit 207 generates a defect-highlighted image by highlighting each processing target defect in the corrected difference image. Details of the processing are similar to those of step S803, so that redundant descriptions thereof are omitted. In the present exemplary embodiment, in a case where the processing target defect is the vertical-line defect or the horizontal-line defect, a defect-highlighted image is generated based on the corrected difference image. In step S805, the inspection processing unit 207 performs threshold value processing on pixel values of the defect-highlighted image using the threshold value $Th_1$. The inspection processing unit 207 detects each pixel of the defect-highlighted image that has a pixel value greater than or equal to the threshold value $Th_1$ as a defect pixel by the threshold value processing. In step S806, the inspection processing unit 207 performs threshold value processing on the area of the defect region of the defect-highlighted image using the threshold value $Th_2$. The inspection processing unit 207 eliminates the pixels of the defect region having a smaller number of continuous pixels than the threshold value $Th_2$ from the defect pixels detected in step S805 by the threshold value processing.

In step S807, the inspection processing unit 207 determines whether there is an unprocessed defect type. In a case where there is an unprocessed defect type (YES in step S807), the processing target defect is updated, and the processing proceeds to step S801. On the other hand, in a case where there is not an unprocessed defect type (NO in step S807), the processing proceeds to step S808. In step S808, the inspection processing unit 207 outputs an inspection result. In a case where there is not a defect region with respect to all the defect types, the inspection result is "pass", whereas in a case where there is a defect region with respect to any of the defect types, the inspection result is "fail".

Advantages of First Exemplary Embodiment

As described above, the image processing apparatus 100 according to the present exemplary embodiment sets a reference image that is a desired printing result. The detection sensitivity is set for a plurality of defect types. Image data representing an inspection target image is acquired. A difference image representing a difference between the reference image and the inspection target image is generated. The difference image is corrected by replacing each pixel value of the difference image that is greater than a threshold value with the threshold value. The inspection target image is inspected based on the detection sensitivity, the difference image, and the corrected difference image. This prevents a contrast between a defect and a background of the defect from varying significantly between the defect types. Thus, even in a case where a contrast between a defect and a background of the defect varies depending on the defect type, printed materials can be inspected with high accuracy.

MODIFIED EXAMPLE

While the detection sensitivity setting unit 203 according to the present exemplary embodiment sets the detection sensitivity in three levels, a method of setting the detection sensitivity is not limited to that described above. For example, the detection sensitivity can be set in two levels or in four or more levels. The detection sensitivity for any of the defects can be fixed. A settable range of the detection sensitivity can be changed based on the defect type. For example, the detection sensitivity for the point defect is settable from two levels that are "intermediate" and "low" while the detection sensitivities for the vertical-line defect and the horizontal-line defect are fixed to "high". In this case, the highest detection sensitivity is constantly "high", so that point defects are detected based on the difference image whereas vertical-line defects and horizontal-line defects are detected based on the corrected difference image. In a case where the correspondence between the difference image or the corrected difference image and the defect types does not change as described above, the inspection processing unit 207 can change the subsequent processing based on the processing target defect type in step S802.

While there are three types of detection target defects that are the point defect, the vertical-line defect, and the horizontal-line defect in the present exemplary embodiment, combinations of detection target defects are not limited to that described above. For example, two types that are the point defect and the vertical-line defect can be the detection target defects. A line-shaped defect of any directions can be added as a detection target defect. In a case where the line-shaped defect is a processing target defect, the inspection processing unit 207 acquires a defect-highlighted image generated by highlighting line-shaped patterns in the difference image by combining filters that highlight lines of various directions.

While the difference image correction unit 206 generates the corrected difference image based on the threshold values set based on the detection sensitivity in the present exemplary embodiment, the threshold values can be set so that the corrected difference image becomes equal to the difference image. For example, in a case where the difference between the highest detection sensitivity and the lowest detection sensitivity for the processing target inspection region identified in step S702 is less than a predetermined value, the threshold values are set to a greater value than a maximum possible value of the pixel values of the difference image. This equalizes the corrected difference image to the difference image. Alternatively, in a case where the highest detection sensitivity for the processing target inspection region is lower than a predetermined detection sensitivity, the threshold values can be set to a greater value than the maximum possible value of the pixel values of the difference image.

While the threshold value processing on the pixel values and the threshold value processing on the area are performed in the inspection process in the present exemplary embodiment, only the threshold value processing on the pixel values can be performed to detect a defect region. In this case, the threshold value for the detection sensitivity is set only for the pixel values.

While a user is notified of whether an inspection target image passes or fails the inspection in the present exemplary embodiment, a defect region of the inspection target image that fails can be displayed on the UI panel 108.

In the first exemplary embodiment, the entire reference image is set as a single inspection region. In a second exemplary embodiment, a plurality of inspection regions is set in the reference image. A configuration of the printing system and a functional configuration of the image processing apparatus 100 according to the present exemplary embodiment are similar to those in the first exemplary embodiment, so that redundant descriptions thereof are omitted. Mainly steps S306 and S307, which differ between the present exemplary embodiment and the first exemplary embodiment, will be described below. Each configuration similar to that in the first exemplary embodiment is given the same reference numeral and will be described below with reference to the same reference numeral.

<Inspection Regions and Detection Sensitivities>

Figure 5B:
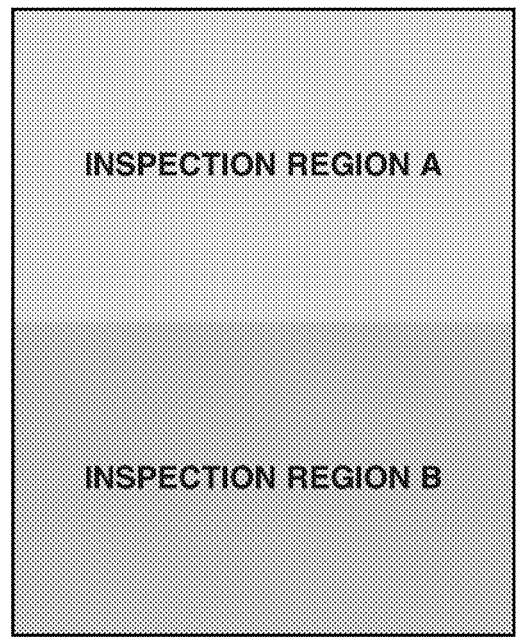

FIG. 5B illustrates an example of inspection regions in the present exemplary embodiment. In the present exemplary embodiment, in step S302, the region setting unit 202 sets inspection regions A and B in the reference image. FIG. 6B illustrates an example of the detection sensitivity for the defects in the present exemplary embodiment. In the present exemplary embodiment, in step S303, the detection sensitivity setting unit 203 sets the detection sensitivity for the defects in the inspection region A to "low". The detection sensitivity setting unit 203 sets the detection sensitivity for the point defect in the inspection region B to "low" and sets the detection sensitivities for the vertical-line defect and the horizontal-line defect in the inspection region B to "high".

<Process for Correcting Difference Image>

Figure 10:
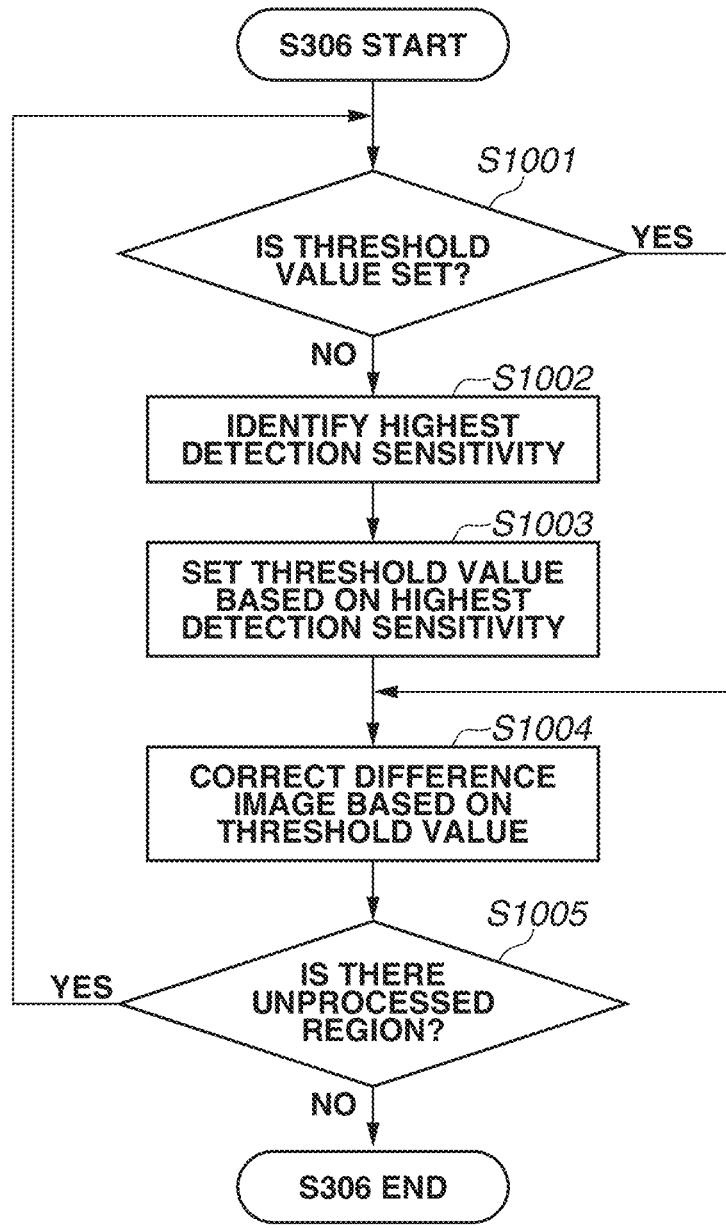
FIG. 10 is a flowchart illustrating a process for correcting a difference image.

In step S306, the difference image correction unit 206 sets a threshold value for each inspection region based on the detection sensitivity and clips pixel values of the difference image. FIG. 10 is a flowchart illustrating a process for correcting the difference image. Details of the process for correcting the difference image will be described below.

In step S1001, the difference image correction unit 206 determines whether the threshold value is set for the processing target inspection region. In a case where the threshold value is set (YES in step S1001), the processing proceeds to step S1004. On the other hand, in a case where the threshold value is not set (NO in step S1001), the processing proceeds to step S1002. In step S1002, the difference image correction unit 206 identifies the highest detection sensitivity for the processing target inspection region. In the present exemplary embodiment, the highest detection sensitivity for the inspection region A is "low", and the highest detection sensitivity for the inspection region B is "high".

In step S1003, the difference image correction unit 206 sets the threshold value for the processing target inspection region based on the highest detection sensitivity. In the present exemplary embodiment, the difference image correction unit 206 sets the threshold value so that the higher the highest detection sensitivity, the smaller the set threshold value. In the present exemplary embodiment, the threshold value for the inspection region A is set to the threshold value $Th_A$, and the threshold value for the inspection region B is set to the threshold value $Th_B$. The threshold values $Th_A$ and $Th_B$ are set so that the threshold value $Th_A$ is greater than the threshold value $Th_B$.

Figure 11:
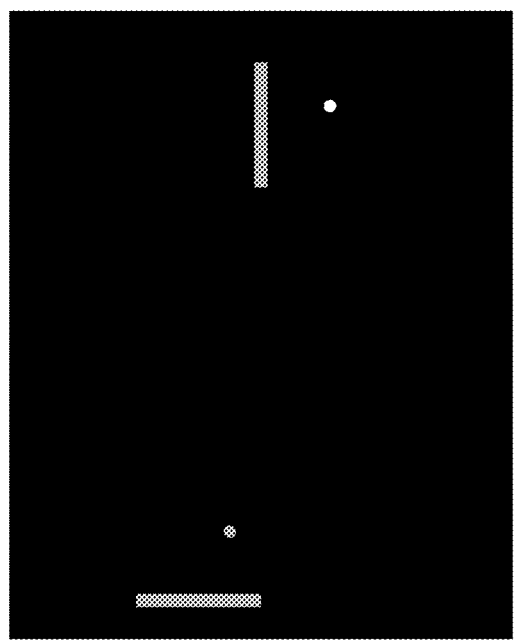
FIG. 11 illustrates an example of a corrected difference image.

In step S1004, the difference image correction unit 206 generates a corrected difference image by clipping pixel values of the difference image based on the threshold value for the processing target region. Specifically, the difference image correction unit 206 replaces each pixel value of pixels having a greater pixel value than the threshold value $Th_A$ in the inspection region A of the difference image with the threshold value $Th_A$. The difference image correction unit 206 replaces each pixel value of pixels having a greater pixel value than the threshold value $Th_B$ in the inspection region B of the difference image with the threshold value $Th_B$. An example of the corrected difference image generated by the processing in step S1004 is illustrated in FIG. 11. By the processing of step S1004, each pixel value corresponding to a defect such as a mark with a high contrast to a background in the difference image is replaced with the threshold value set for each inspection region. In step S1005, the difference image correction unit 206 determines whether there is an unprocessed region. In a case where there is an unprocessed region (YES in step S1005), the processing target region is updated, and the processing proceeds to step S1001. On the other hand, in a case where there is not an unprocessed region (NO in step S1005), the processing of step S306 is ended.

<Inspection Process>

Figure 12:
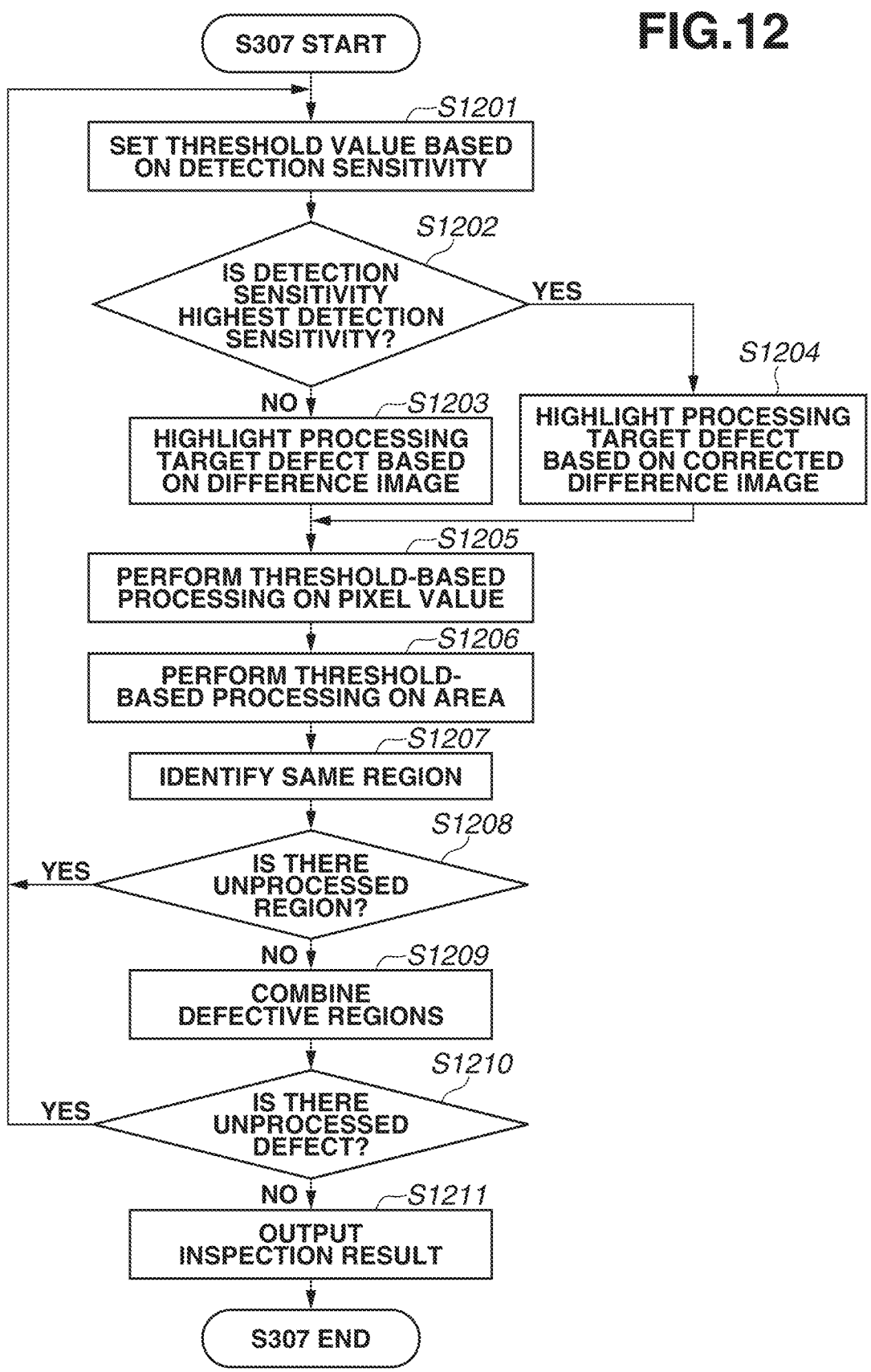
FIG. 12 is a flowchart illustrating an inspection process.
Figure 13:
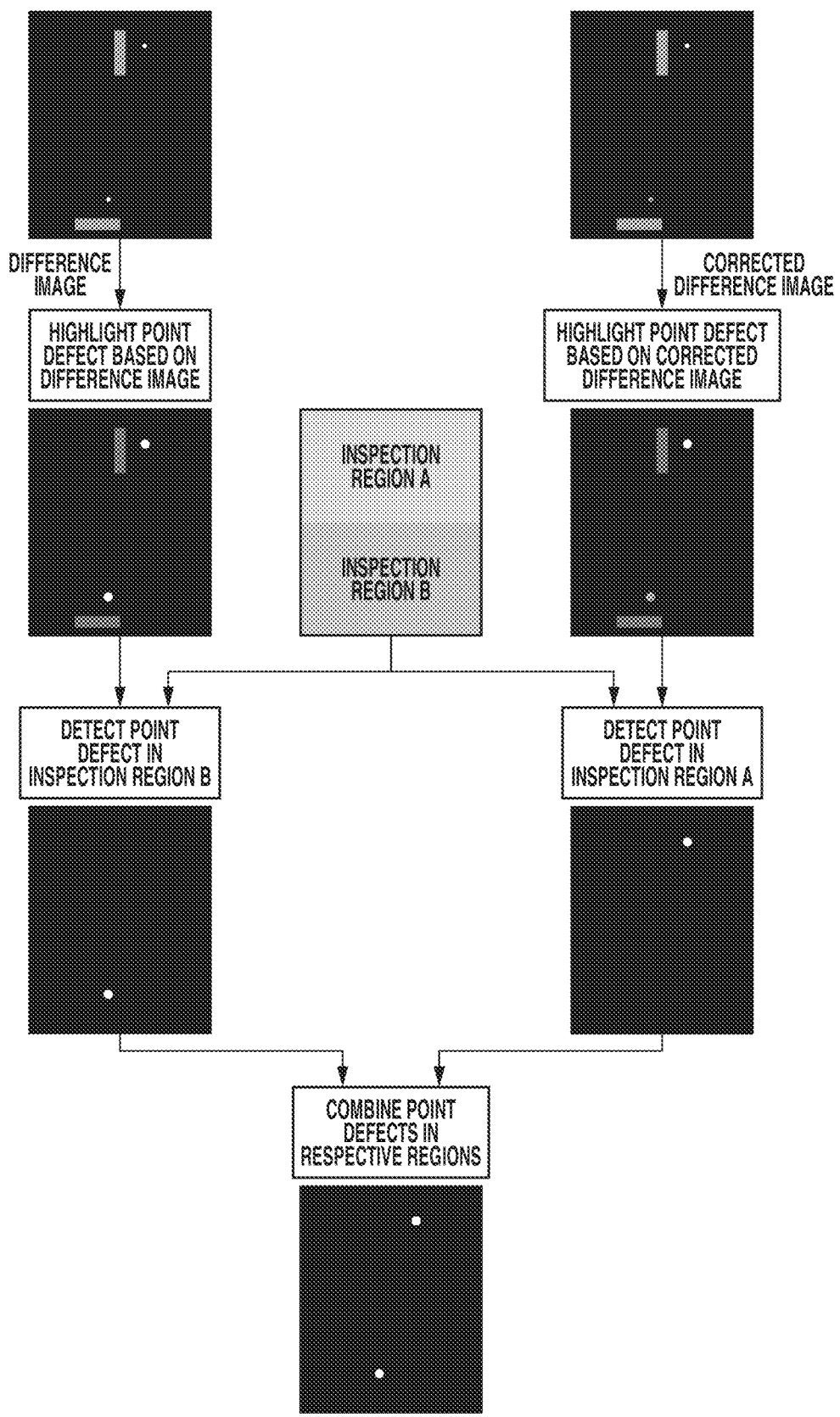
FIG. 13 is a diagram illustrating an outline of the inspection process focused on point defects.
Figure 14:
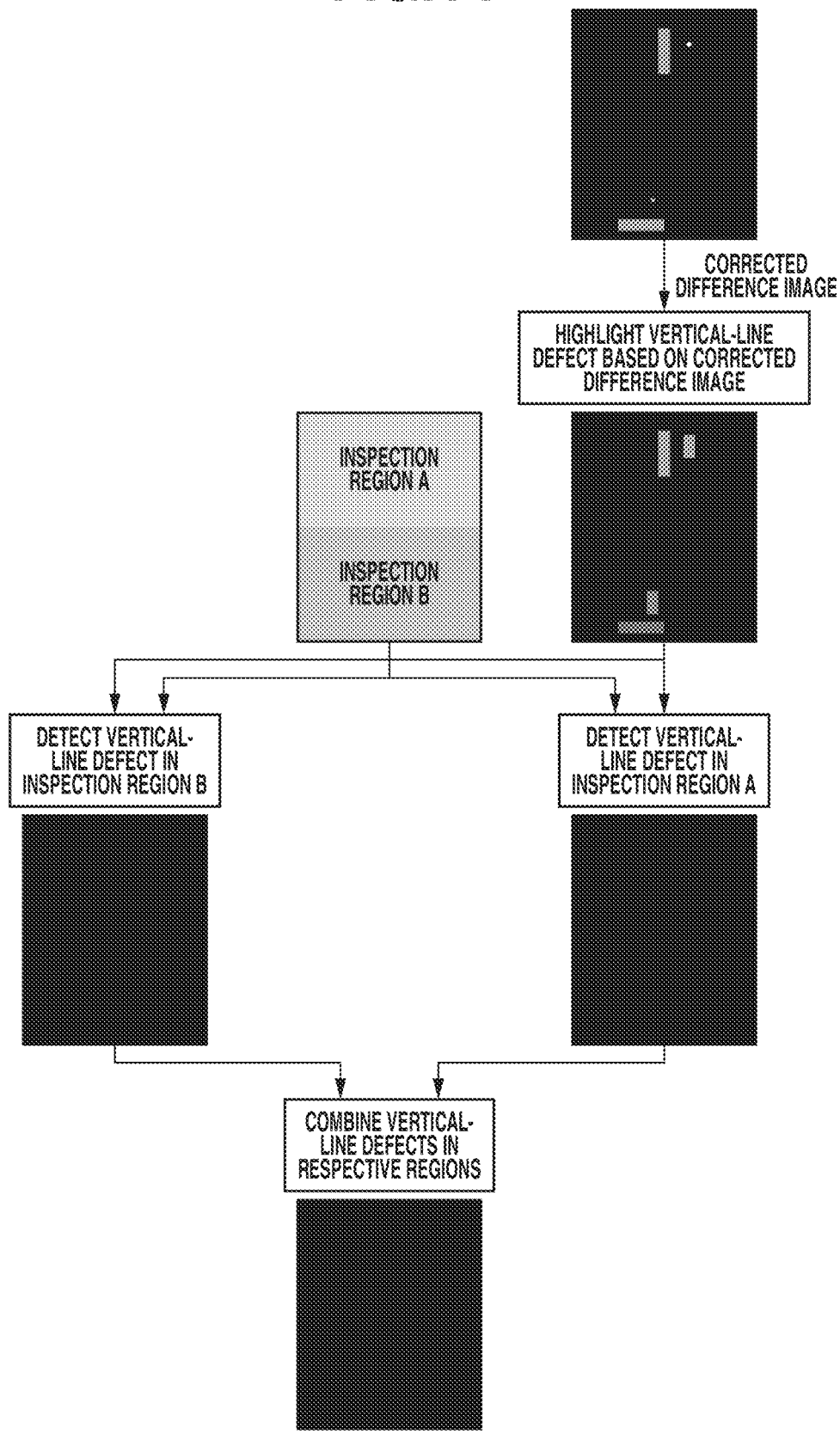
FIG. 14 is a diagram illustrating an outline of the inspection process focused on vertical-line defects.
Figure 15:
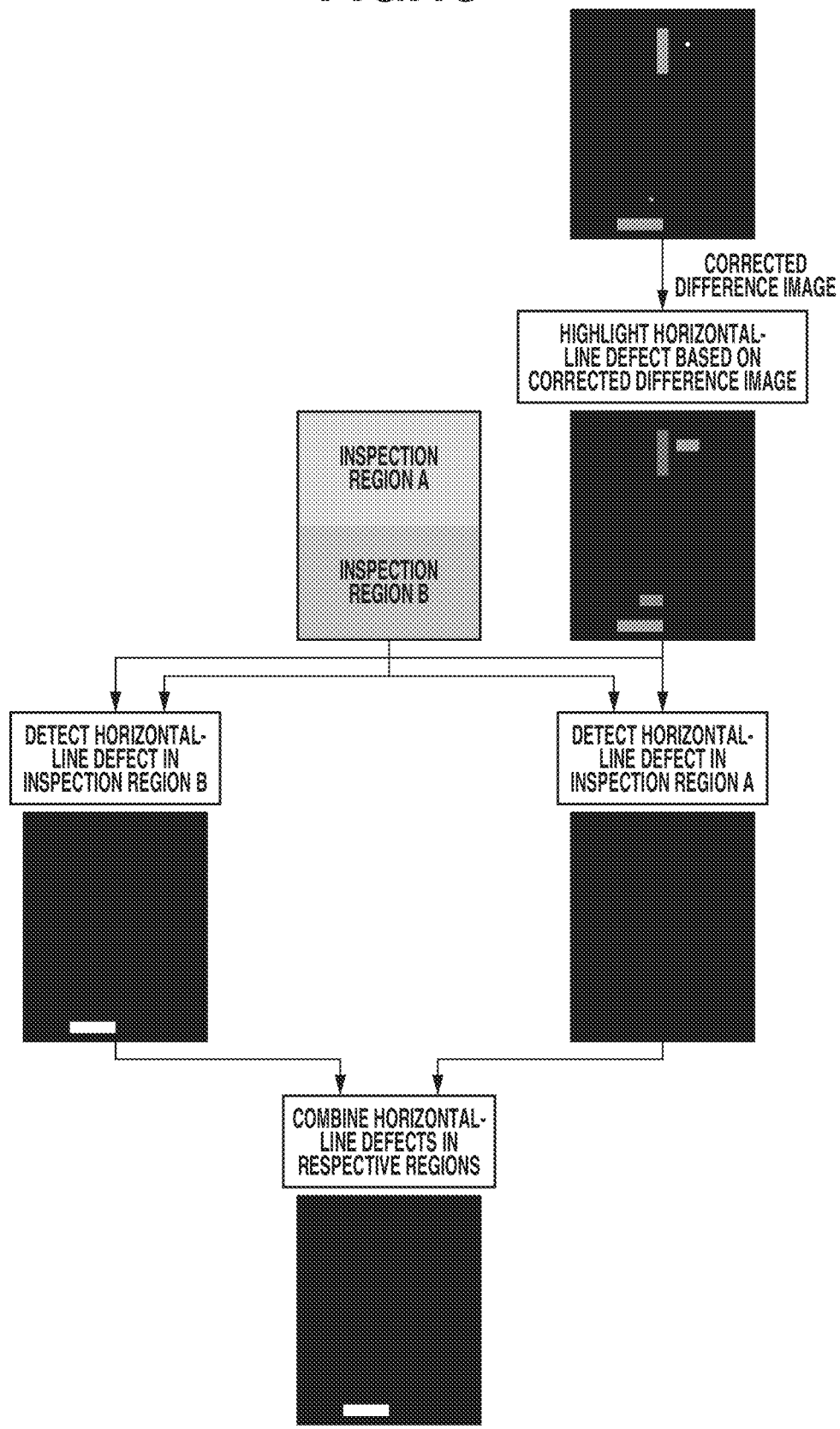
FIG. 15 is a diagram illustrating an outline of the inspection process focused on horizontal-line defects.

In step S307, the inspection processing unit 207 inspects the inspection target image based on the difference image, the corrected difference image, and the detection sensitivity and outputs an inspection result. FIG. 12 is a flowchart illustrating an inspection process. FIG. 13 is a diagram illustrating an outline of the inspection process focused on the point defect. FIG. 14 is a diagram illustrating an outline of the inspection process focused on the vertical-line defect. FIG. 15 is a diagram illustrating an outline of the inspection process focused on the horizontal-line defect. Details of the inspection process will be described below. Steps S1201 to S1206 are similar to steps S801 to S806 in the first exemplary embodiment, so that redundant descriptions thereof are omitted.

In step S1207, the inspection processing unit 207 identifies the same region in the processing target inspection region and the defect region. This makes it possible to detect only the defect region in the processing target inspection region. In step S1208, the inspection processing unit 207 determines whether there is an unprocessed inspection region. In a case where there is an unprocessed inspection region (YES in step S1208), the processing target inspection region is updated, and the processing proceeds to step S1201. On the other hand, in a case where there is not an unprocessed inspection region (NO in step S1208), the processing proceeds to step S1209.

In step S1209, the inspection processing unit 207 combines the defect regions of the inspection regions. Consequently, the defect region for the processing target defect is acquired. In step S1210, the inspection processing unit 207 determines whether there is an unprocessed defect type. In a case where there is an unprocessed defect type (YES in step S1210), the processing target defect is updated, and the processing proceeds to step S1201. On the other hand, in a case where there is not an unprocessed defect type (NO in step S1210), the processing proceeds to step S1211. In step S1211, the inspection processing unit 207 outputs an inspection result. In a case where there is not a defect region with respect to all the defect types, the inspection result is "pass", whereas in a case where there is a defect region with respect to any of the defect types, the inspection result is "fail".

Advantages of Second Exemplary Embodiment

As described above, the image processing apparatus 100 according to the present exemplary embodiment sets a plurality of inspection regions in the reference image and performs the defect detection on each inspection region. This makes it possible to set a different inspection reference for each region, and the quality of printed materials and productivity are both maintained.

MODIFIED EXAMPLE

While the region setting unit 202 in the present exemplary embodiment sets two regions that are the inspection regions A and B as inspection regions, a method of setting inspection regions is not limited to that described above. For example, three or more regions can be set as inspection regions. A non-inspection region on which the defect detection is not to be performed can be set. In a case where a non-inspection region is set, each pixel value of the non-inspection region in the difference image generated in step S305 is set to zero to not detect a defect in the non-inspection region.

While the processing is performed on each inspection region in the present exemplary embodiment, the inspection regions that have the same highest detection sensitivity can be processed collectively. For example, in a case where the detection sensitivities are as illustrated in FIG. 6C, the highest detection sensitivities of the inspection regions A and B are both "high". In this case, the threshold values corresponding to the highest detection sensitivities for the inspection regions A and B are the same values, so that processing the inspection regions A and B collectively produces the same result as the result of processing the inspection regions A and B separately.

Other Exemplary Embodiments

The present exemplary embodiment is also realized by the following process. Specifically, a program for realizing one or more functions of the above-described exemplary embodiments is fed to a system or an apparatus via a network or a storage medium, and one or more processors of a computer of the system or the apparatus reads the program and executes the read program. Embodiments of the present disclosure also include a circuit (e.g., application-specific integrated circuit (ASIC)) that realizes one or more functions.

The present exemplary embodiment realizes highly-accurate inspection of printed materials even in a case where a contrast between a defect and a background of the defect varies depending on the defect type.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-058463, filed Mar. 27, 2020, which is hereby incorporated by reference herein in its entirety.

What is claimed is:

1. An image processing apparatus comprising:
an acquisition unit configured to acquire reference data and image data representing an inspection target image, the reference data representing a reference image that is a reference printing result;
a setting unit configured to set a detection sensitivity for a plurality of defects in a printing result;
a correction unit configured to correct a difference image acquired from the reference data and the image data so that a difference in the difference image that is greater than a threshold value is reduced; and
a processing unit configured to inspect the inspection target image based on the detection sensitivity and the corrected difference image.

2. The image processing apparatus according to claim 1, wherein the correction unit sets the threshold value different for the each defect based on the detection sensitivity.

3. The image processing apparatus according to claim 1, wherein the correction unit sets the threshold value based on the highest one of the detection sensitivities for the plurality of types of defects.

4. The image processing apparatus according to claim 1, wherein the correction unit sets the threshold value so that the higher the detection sensitivity, the smaller the set threshold value.

5. The image processing apparatus according to claim 1, wherein the correction unit sets the threshold value based on the highest one and the lowest one of the detection sensitivities for the plurality of types of defects.

6. The image processing apparatus according to claim 1, wherein the correction unit corrects the difference image so that the difference that is greater than the threshold value becomes smaller than or equals to the threshold value.

7. The image processing apparatus according to claim 1, wherein the processing unit detects a defect for which the detection sensitivity is set low based on the difference image whereas the processing unit detects a defect for which the detection sensitivity is set high based on the corrected difference image.

8. The image processing apparatus according to claim 1, wherein the processing unit highlights a defect in the difference image or the corrected difference image and detects a region having a large pixel value in the difference image as a region corresponding to the defect.

9. The image processing apparatus according to claim 1, wherein the setting unit sets the detection sensitivity for the plurality of types of defects based on a user instruction.

10. The image processing apparatus according to claim 1, wherein the setting unit sets a different detection sensitivity for each of the plurality of types of defects.

11. The image processing apparatus according to claim 1, wherein the setting unit sets at least the detection sensitivity for a point-shaped defect and the detection sensitivity for a line-shaped defect.

12. The image processing apparatus according to claim 1, wherein the setting unit sets a plurality of inspection regions in the reference image and sets the detection sensitivity for each of the plurality of inspection regions.

13. A non-transitory computer-readable storage medium storing instructions that, when executed by a computer, cause the computer to perform a method comprising:

acquiring reference data and image data representing an inspection target image, the reference data representing a reference image that is a reference printing result;

setting a detection sensitivity for a plurality of types of defects in a printing result;

correcting a difference image acquired from the reference data and the image data so that a difference in the difference image that is greater than a threshold value is reduced; and inspecting the inspection target image based on the detection sensitivity and the corrected difference image.

14. An image processing method comprising:

acquiring reference data and image data representing an inspection target image, the reference data representing a reference image that is a reference printing result;

setting a detection sensitivity for a plurality of defects in a printing result;

correcting a difference image acquired from the reference data and the image data so that a difference in the difference image that is greater than a threshold value is reduced; and inspecting the inspection target image based on the detection sensitivity and the corrected difference image.

* * * * *